(12) United States Patent
Asaga et al.

(10) Patent No.: US 8,851,558 B2
(45) Date of Patent: Oct. 7, 2014

(54) VEHICLE BODY STRUCTURE

(75) Inventors: Yasuo Asaga, Nisshin (JP); Hidekazu Nishigaki, Nagoya (JP); Sadayuki Hayashi, Toyota (JP)

(73) Assignee: Kabushiki Kaisha Toyota Chuo Kenkyusho, Aichi-Gun (JP)

( * ) Notice: Subject to any disclaimer, the term of this patent is extended or adjusted under 35 U.S.C. 154(b) by 356 days.

(21) Appl. No.: 13/111,402

(22) Filed: May 19, 2011

(65) Prior Publication Data

US 2011/0285170 A1    Nov. 24, 2011

(30) Foreign Application Priority Data

May 24, 2010    (JP) .................................. 2010-118601

(51) Int. Cl.
*B60J 7/00*    (2006.01)
*B62D 25/00*    (2006.01)
*B62D 23/00*    (2006.01)

(52) U.S. Cl.
CPC .............. *B62D 23/005* (2013.01); *B62D 25/00* (2013.01)
USPC .................................................... 296/203.01

(58) Field of Classification Search
USPC .......... 296/203.01, 155, 187.12, 203.02, 204, 296/205, 187.03; 180/14.1, 235, 420, 6.48, 180/9.5; 33/608; 114/67 A; 280/124.135, 280/5.507, 5.514
See application file for complete search history.

(56) References Cited

U.S. PATENT DOCUMENTS

| | | | | |
|---|---|---|---|---|
| 2,068,715 A | * | 1/1937 | Stevens ....................... | 296/181.1 |
| 2,354,700 A | * | 8/1944 | Pezzano .......................... | 293/48 |
| 2,389,907 A | * | 11/1945 | Helmuth ................... | 296/203.01 |
| 2,903,295 A | * | 9/1959 | Brahmstedt ................ | 296/181.1 |
| 3,539,030 A | * | 11/1970 | Gerin ............................ | 180/89.1 |
| 4,045,075 A | * | 8/1977 | Pulver ........................... | 296/205 |
| 4,205,872 A | * | 6/1980 | Bollinger ....................... | 296/205 |
| 4,217,970 A | * | 8/1980 | Chika ............................ | 180/298 |
| 4,640,527 A | * | 2/1987 | Taylor ........................... | 280/781 |
| 4,810,028 A | * | 3/1989 | Henricks ................... | 296/187.03 |
| 4,973,082 A | * | 11/1990 | Kincheloe ..................... | 280/756 |
| 5,094,313 A | * | 3/1992 | Mauws ......................... | 180/210 |
| 5,213,386 A | * | 5/1993 | Janotik et al. .................... | 296/29 |
| 5,332,281 A | * | 7/1994 | Janotik et al. ................. | 296/209 |
| 5,725,270 A | * | 3/1998 | Fleishman ................. | 296/181.1 |
| 5,848,853 A | * | 12/1998 | Clenet ........................... | 403/272 |
| 6,022,070 A | * | 2/2000 | Ashina et al. ................. | 296/205 |
| 6,299,246 B1 | * | 10/2001 | Tomka ......................... | 296/205 |
| 6,621,037 B2 | * | 9/2003 | Gabbianelli et al. ............ | 219/94 |
| 6,623,067 B2 | * | 9/2003 | Gabbianelli et al. .......... | 296/205 |
| 6,713,707 B2 | * | 3/2004 | Gabbianelli et al. ............ | 219/94 |
| 6,796,398 B1 | * | 9/2004 | DeGevay ...................... | 180/311 |
| 6,824,204 B2 | * | 11/2004 | Gabbianelli et al. .......... | 296/205 |

(Continued)

FOREIGN PATENT DOCUMENTS

JP    A-2010-023706    2/2010

*Primary Examiner* — Kiran B Patel
(74) *Attorney, Agent, or Firm* — Oliff PLC

(57) ABSTRACT

A vehicle body structure of the present invention includes an elastic base frame formed in a ring shape; and three elastic upper frames each formed in a ring shape, the three upper frames being disposed on the base frame so as to configure a tetrahedron with the base frame, the three upper frames being connected to the base frame, and the upper frames that are adjacent to each other in a peripheral direction of the base frame being connected to each other. A vehicle body structure is hence provided capable of exhibiting high impact absorption properties.

6 Claims, 15 Drawing Sheets

(56) References Cited

U.S. PATENT DOCUMENTS

| | | | |
|---|---|---|---|
| 7,044,535 B2* | 5/2006 | Durand | 296/203.01 |
| 7,077,459 B2* | 7/2006 | Toth et al. | 296/178 |
| 7,175,200 B1* | 2/2007 | Obershan | 280/756 |
| D575,675 S * | 8/2008 | Williams et al. | D12/87 |
| 8,162,388 B2* | 4/2012 | Balzer et al. | 296/203.03 |
| 8,171,641 B2* | 5/2012 | Lowe | 29/897.2 |

\* cited by examiner

VEHICLE BODY STRUCTURE

CROSS-REFERENCE TO RELATED APPLICATION

This application is claims priority under 35 USC 119 from Japanese Patent Application No. 2010-118601 filed on May 24, 2010, the disclosure of which is incorporated by reference herein.

BACKGROUND

1. Technical Field

The present invention relates to a vehicle body structure.

2. Related Art

A vehicle body structure is described in Japanese Patent Application Laid-Open No. 2010-23706 that includes a ring shaped vehicle body frame member and a vehicle compartment formed above the vehicle body frame member.

However, there is a requirement for capability to exhibit high impact absorption properties in a type similar to this structure.

SUMMARY

In consideration of the above circumstances the present invention provides a vehicle body structure capable of exhibiting high impact absorption properties.

A first aspect of the present invention is a vehicle body structure including: an elastic base frame formed in a ring shape; and three elastic upper frames each formed in a ring shape, the three upper frames being disposed on the base frame so as to configure a tetrahedron with the base frame, the three upper frames being connected to the base frame, and the upper frames that are adjacent to each other in a peripheral direction of the base frame being connected to each other.

According to the above vehicle body structure, the base frame and the three upper frames are disposed in a state so as to configure a tetrahedron and are connected to each other. Consequently, whichever direction an impact load is input to the vehicle body structure, the impact energy can be absorbed by transmitting (spreading) the impact load over the base frame and the three upper frames as a whole and inducing elastic deformation in the whole. High impact absorption properties can accordingly be exhibited.

A vehicle body structure of a second aspect of the present invention is the vehicle body structure of the first aspect, wherein: the base frame is disposed substantially parallel to a vehicle horizontal direction; and the three upper frames include a first upper frame that are disposed so as to extend along a vehicle width direction at a front portion of the base frame in a vehicle front-rear direction, and a pair of second upper frames that are disposed at a rear portion of the first upper frame in the vehicle front-rear direction and that is configured to be symmetrical about a plane at a central portion of the base frame in the vehicle width direction.

According to such a vehicle body structure, even when impact load is input from the front face to the base frame and the first upper frame during a vehicle frontal impact the impact load can be transmitted to (spread over) the pair of second upper frames. Elastic deformation can thereby be induced in the pair of second upper frames in addition to in the base frame and the first upper frame, enabling more impact energy to be absorbed and enabling high impact absorption properties to be exhibited during the vehicle frontal impact.

The vehicle body structure of a third aspect of the present invention is the vehicle body structure of the first aspect of the present invention wherein the base frame and the three upper frames are each formed with fiber reinforced composites.

According to such a vehicle body structure, due to the base frame and the three upper frames being formed with fiber reinforced composites, a lightweight vehicle body can be achieved while still exhibiting high impact absorption properties.

A vehicle body structure of a fourth aspect of the present invention is the vehicle body structure of the first aspect of the present invention, further including an impact absorbing member provided at a vehicle outer side of the base frame.

According to such a vehicle body structure, the impact absorption properties can be further raised due to provision of the impact absorbing member on the vehicle outer side of the base frame.

A vehicle body structure of a fifth aspect of the present invention is the vehicle body structure of the first aspect of the present invention, configured by a combination of plural vehicle body units each configured by the base frame and the three upper frames.

According to such a vehicle body structure, due to configuration with a combination of plural of the vehicle body units each configured by the base frame and the three upper frames, space available for a vehicle compartment can be widened while still exhibiting high impact absorption properties.

A vehicle body structure of a sixth aspect of the present invention is a vehicle body structure of a fifth aspect of the present invention, further including an impact absorbing member provided at a vehicle outer side of one of the base frames that is positioned at a vehicle outermost portion of one of the vehicle body units of the combination of the plurality of vehicle body units.

According to such a vehicle body structure, due to provision of the impact absorbing member at the vehicle outer side of the base frame, the impact absorption properties can be further raised in a configuration of plural combined vehicle body units.

BRIEF DESCRIPTION OF THE DRAWINGS

Exemplary embodiments of the present invention will be described in detail based on the following figures, wherein.

DETAILED DESCRIPTION

Figure 1:
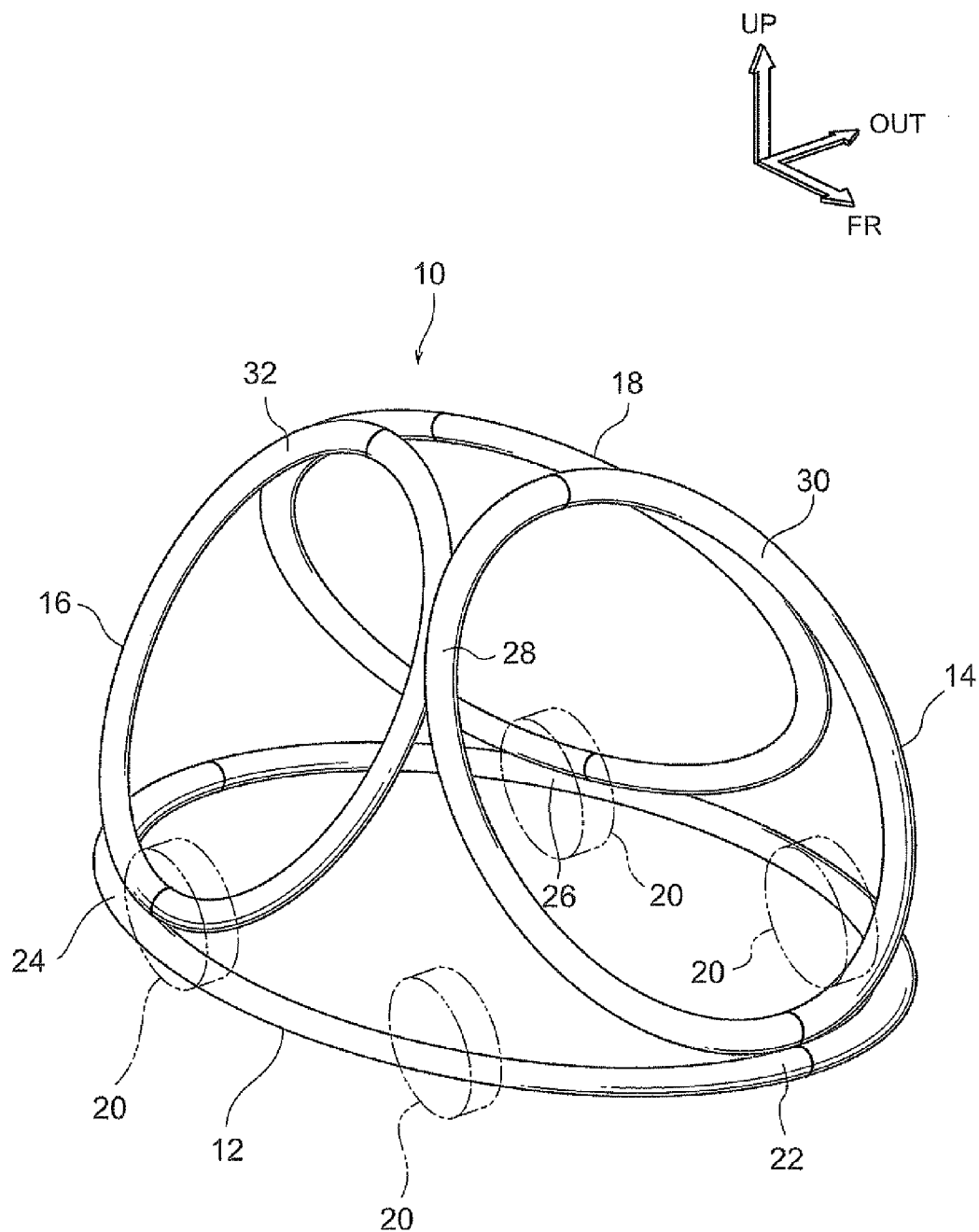
FIG. 1 is a perspective view of a vehicle body structure according to an exemplary embodiment of the present invention.
Figure 2:
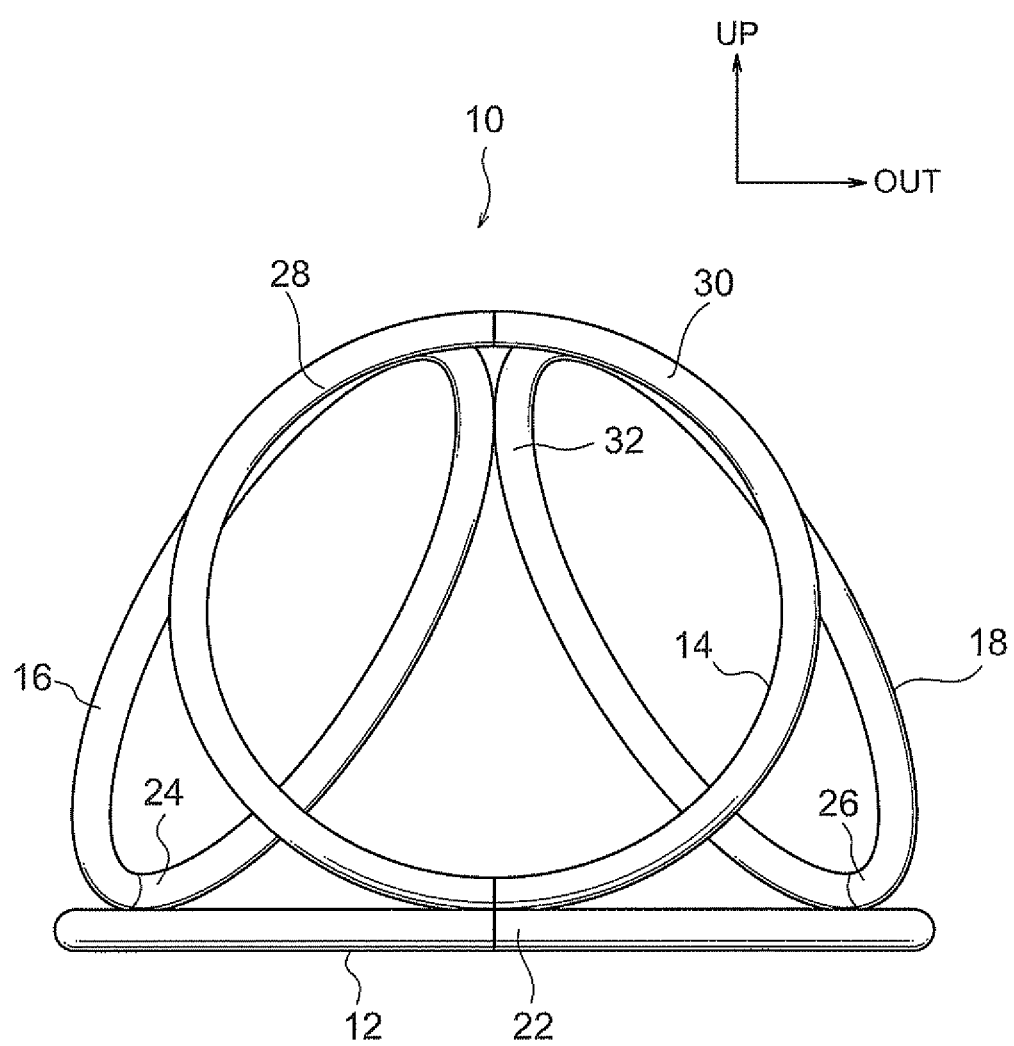
FIG. 2 is a front view of the vehicle body structure illustrated in FIG. 1.
Figure 3:
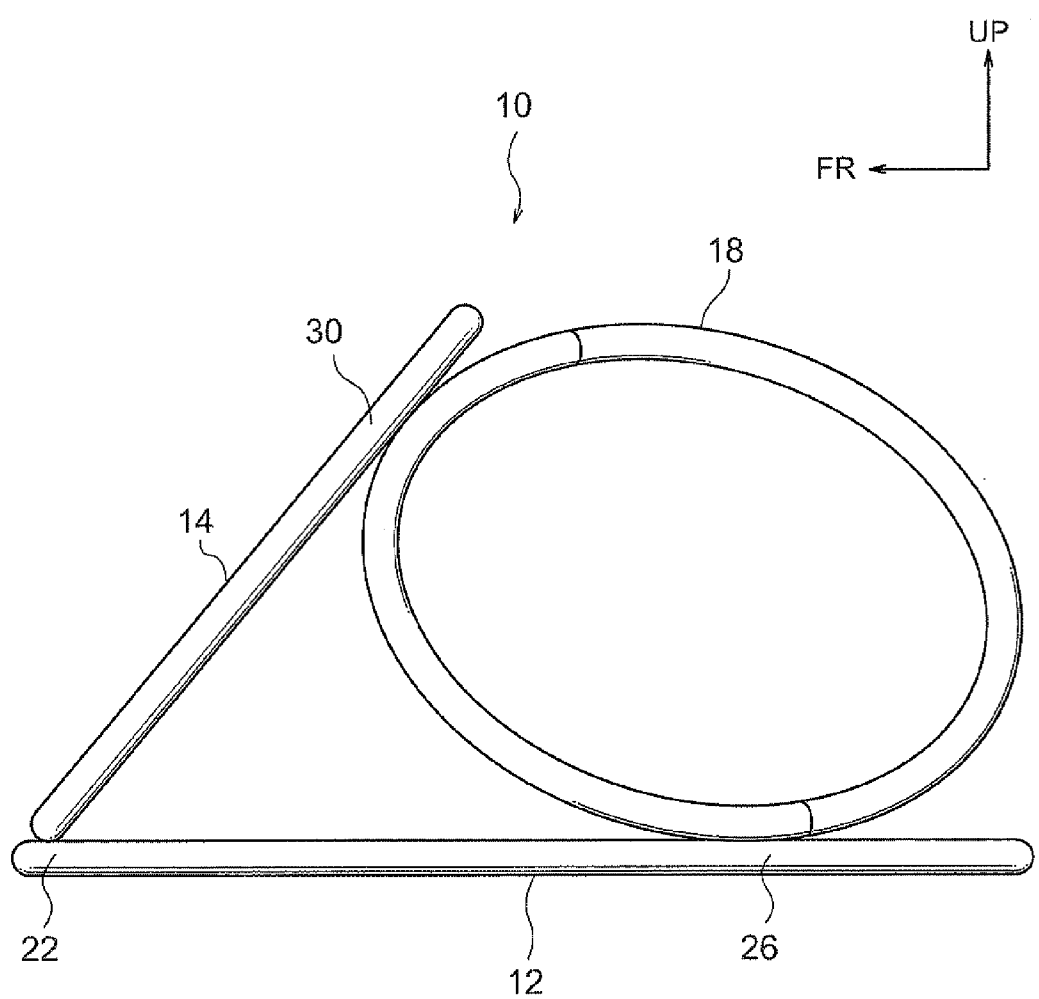
FIG. 3 is a side view of the vehicle body structure illustrated in FIG. 1.
Figure 4:
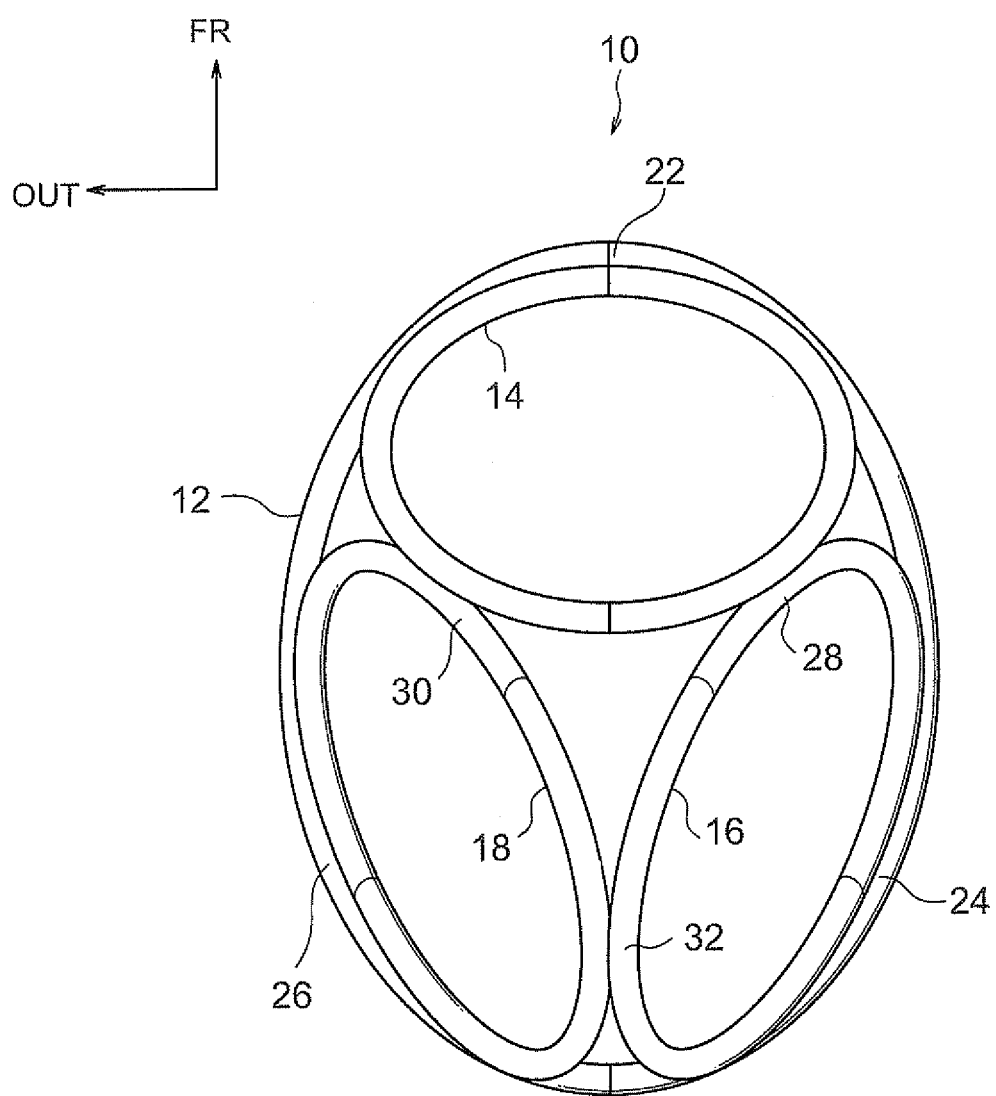
FIG. 4 is a plan view of the vehicle body structure illustrated in FIG. 1.
Figure 5:
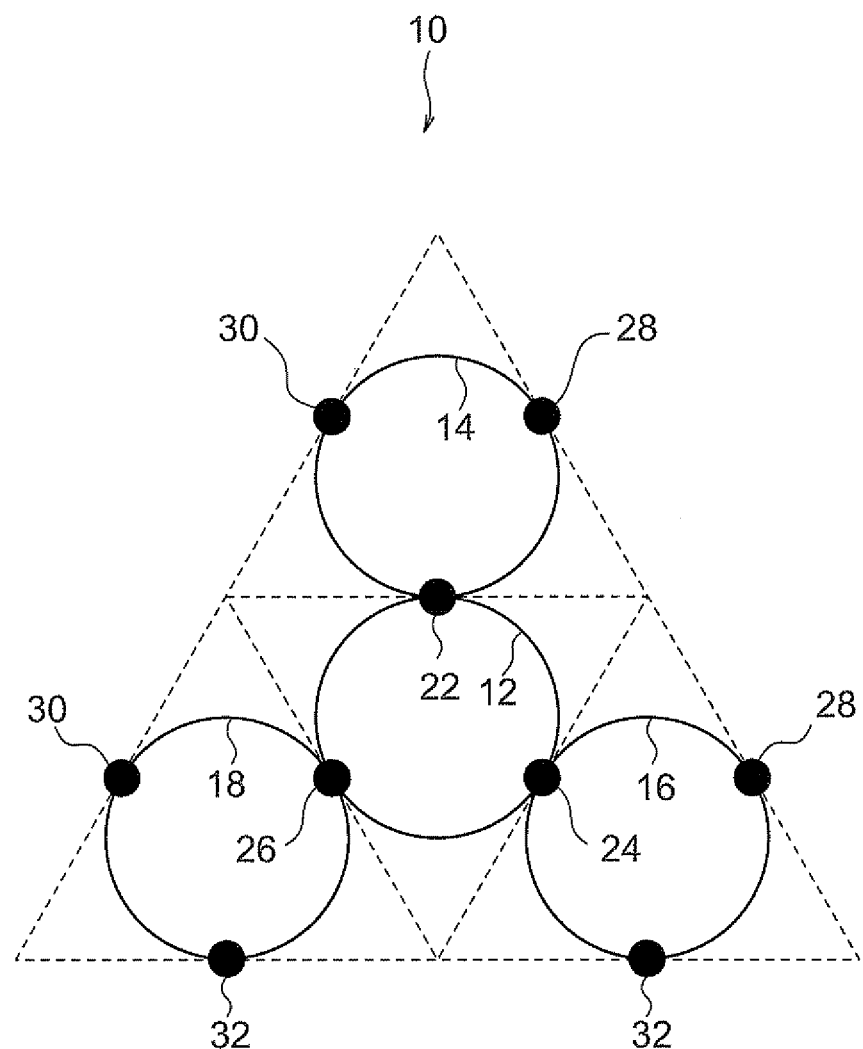
FIG. 5 is a schematic diagram showing an opened out state of the vehicle body structure illustrated in FIG. 1.

Explanation follows regarding an exemplary embodiment of the present invention, with reference to the drawings.

The arrows UP, arrows FR and arrows OUT in each of the drawings indicate top in the vehicle top-bottom direction, front in the vehicle front-rear direction, and outer side (left side) in the vehicle width direction.

As shown in FIG. 1 to FIG. 5, the vehicle body structure 10 according to an exemplary embodiment of the present invention includes a base frame 12, a first upper frame 14 and a pair of second upper frames 16, 18.

The base frame 12, the first upper frame 14, and the pair of second upper frames 16, 18 are each formed in a circular or elliptical ring shape, and are each formed by an elastic hollow body or elastic solid body, such as from fiber reinforced composites like FRP (GFRP and CFRP).

Forming each of these frames as bent hollow bar-shaped pipes is particularly appropriate since easy manufacture is possible while limiting the amount of material used. Forming each of these frames hollow is particularly appropriate since bending strength can be increased while achieving low weight.

The base frame 12 is disposed parallel to the vehicle horizontal direction, and wheels 20 are disposed at four locations on the base frame 12.

The first upper frame 14 and the pair of second upper frames 16, 18 are disposed on the base frame 12 so as to be placed adjacent to each other aligned around the peripheral direction of the base frame 12 and configure a tetrahedron with the base frame 12.

Reference here to configuring a tetrahedron means that when the base frame 12, the first upper frame 14 and the pair of second upper frames 16, 18 are each represented as a plane, these frames are disposed in a configuration that resembles that of a tetrahedron.

The first upper frame 14 is disposed so as to extend along the vehicle width direction at a front portion of the base frame 12 in the vehicle front-rear direction.

The pair of second upper frames 16, 18 are disposed to the rear of the first upper frame 14 in the vehicle front-rear direction, so as to be symmetrical about at plane at the center portion of the base frame 12 in the vehicle width direction.

The base frame 12 is connected to the first upper frame 14 by a connecting section 22, connected to the one second upper frame 16 by a connecting section 24 and connected to the other second upper frame 18 by a connecting section 26.

The first upper frame 14 and the one second upper frame 16 are connected together by a connecting section 28, the first upper frame 14 and the other second upper frame 18 are connected together by a connecting section 30, and the pair of second upper frames 16, 18 are connected to each other by a connecting section 32. Connection of the respective frames is particularly appropriately accomplished by employing a bonding agent or the like.

While explanation has been given of the configuration of the vehicle body structure 10 according to an exemplary embodiment of the present invention, the first upper frame 14 and the pair of second upper frames 16, 18 configure the three upper frames of the present invention.

Explanation follows regarding operation and effect of the exemplary embodiment of the present invention.

According to the vehicle body structure 10, the base frame 12, the first upper frame 14, and the pair of second upper frames 16, 18 are connected to each other in a state in which they are disposed so as to configure a tetrahedron. Accordingly, whatever direction an impact load is input to the vehicle body structure 10, the impact load is then transmitted (dispersed) to the base frame 12, the first upper frame 14, and the pair of second upper frames 16, 18 as a whole, enabling impact energy to be absorbed by elastic deformation of the structure as a whole. High impact absorption properties can thereby be exhibited.

In particular, during an impact to the front face of the vehicle, for example, when impact load is input from the vehicle front to the base frame 12 and the first upper frame 14, the impact load can be also be transmitted (dispersed) to the pair of second upper frames 16, 18. Since this enables elastic deformation to be induced in the pair of second upper frames 16, 18 in addition to in the base frame 12 and the first upper frame 14, more of the impact energy can hence be absorbed, and high impact absorption properties can be achieved during a vehicle frontal impact.

During a vehicle side roll too, load imparted to the ceiling of the vehicle can be transmitted (dispersed) from the first upper frame 14 and the pair of second upper frames 16, 18 to the base frame 12. The base frame 12, the first upper frame 14 and the pair of second upper frames 16, 18 accordingly elastically deform as a whole, enabling high impact absorption properties to be achieved during a vehicle side roll.

The base frame 12, the first upper frame 14 and the pair of second upper frames 16, 18 are also each formed from fiber reinforced plastic and hence a light-weight vehicle body can be achieved while still exhibiting high impact absorption properties.

Explanation follows regarding a modified example of an exemplary embodiment of the present exemplary embodiment.

The base frame 12, the first upper frame 14 and the pair of second upper frames 16, 18 of the above exemplary embodiment may be configured by an elastic metal material. Connecting of the respective frames is particularly appropriately accomplished in such cases by welding or employing fasteners, such as bolts.

While the base frame 12, the first upper frame 14 and the pair of second upper frames 16, 18 are connected to each other with connections portions of single locations above, configuration may be made with connection to each other with connection portions at two locations.

Figure 6:
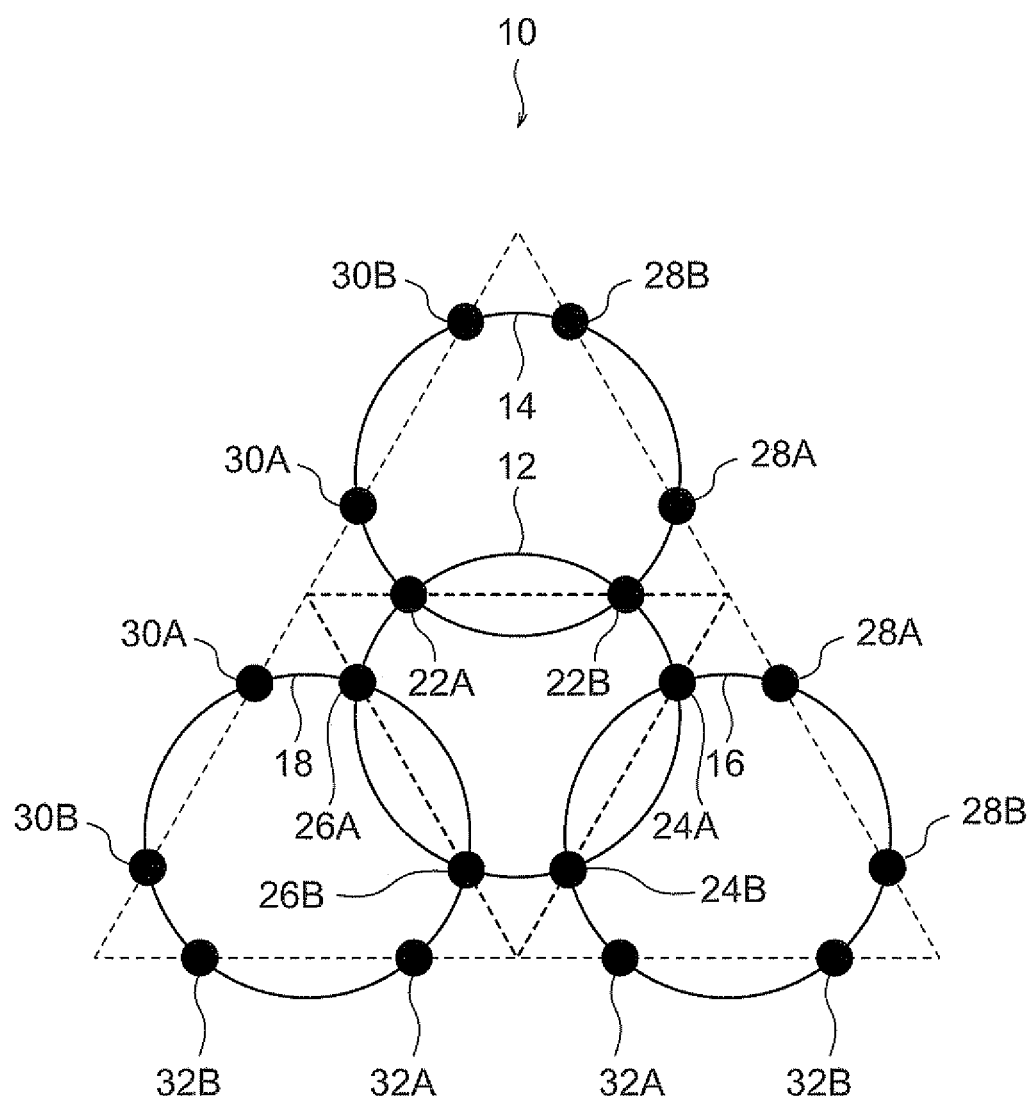
FIG. 6 is a diagram corresponding to that of FIG. 5 showing a modified example of a vehicle body structure according to an exemplary embodiment of the present invention.

Namely configuration may be made, as shown in FIG. 6, with the base frame 12 connected to the first upper frame 14 at connecting sections 22A, 22B, connected to the one second upper frame 16 at connecting sections 24A, 24B, and connected to the other second upper frame 18 at connecting sections 26A, 26B.

Similarly, the first upper frame 14 and the second upper frame 16 are connected together at connecting sections 28A, 28B, the first upper frame 14 and the second upper frame 18 are connected together at connecting sections 30A, 30B, and the pair of second upper frames 16, 18 are connected to each other by connecting sections 32A, 3213.

Figure 7:
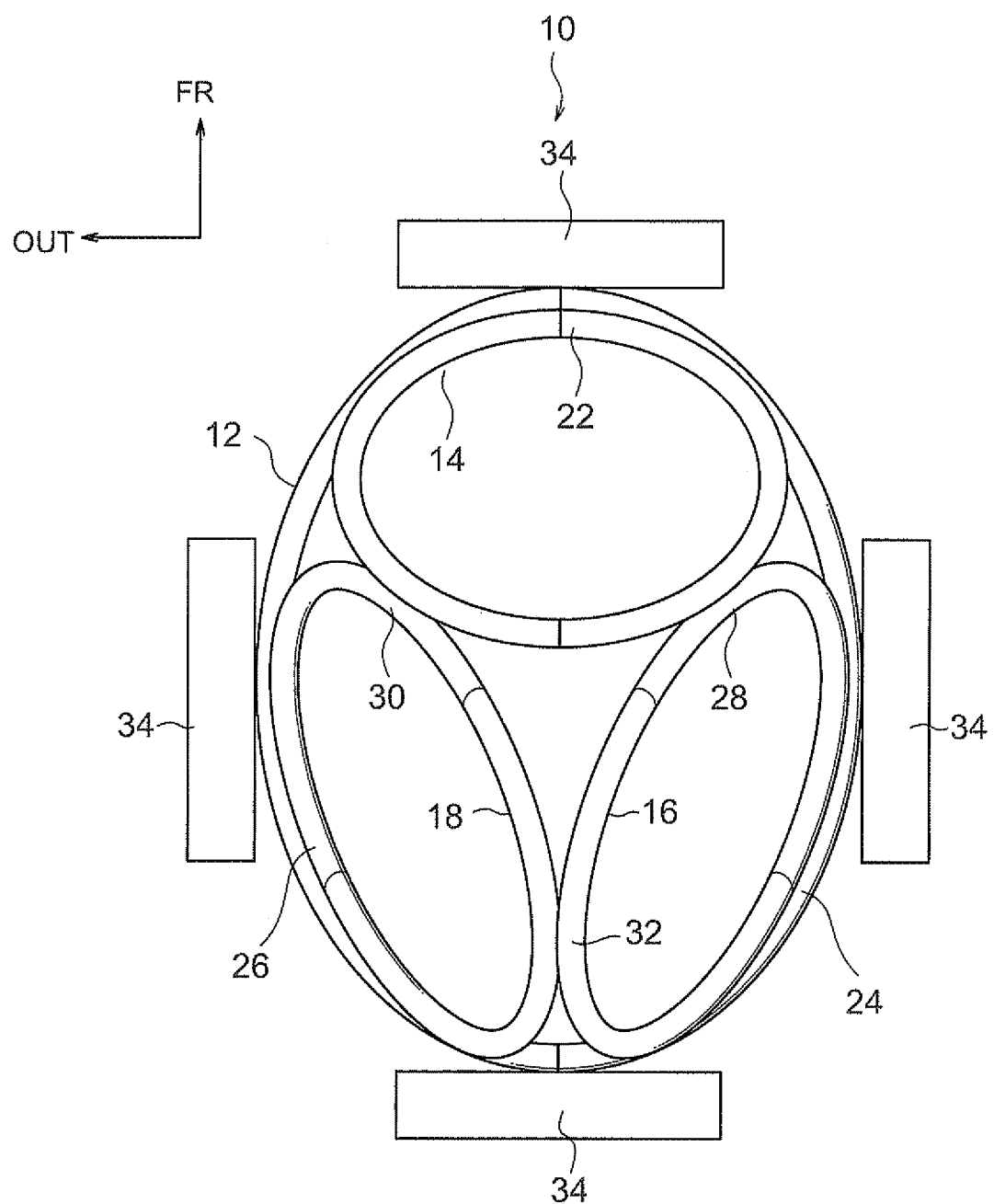
FIG. 7 is a plan view illustrating a modified example of a vehicle body structure according to an exemplary embodiment of the present invention.

As shown in FIG. 7, impact absorbing members 34 may be provided at the vehicle outer side of the base frame 12, namely on the front side and the rear side in the vehicle front-rear direction and on the two sides in the vehicle width direction.

Such a configuration enables the impact absorption properties to be further raised.

While the vehicle body structure 10 is configured above with the base frame 12, the first upper frame 14 and the pair of second upper frames 16, 18, an additional frame or reinforcement member may be added as required.

Configuration of the above exemplary embodiment may be made with the vehicle body structure 10 configured by a combination of plural of the vehicle body units, each configured by a base frame 12, a first upper frame 14 and a pair of second upper frames 16, 18.

Figure 8:
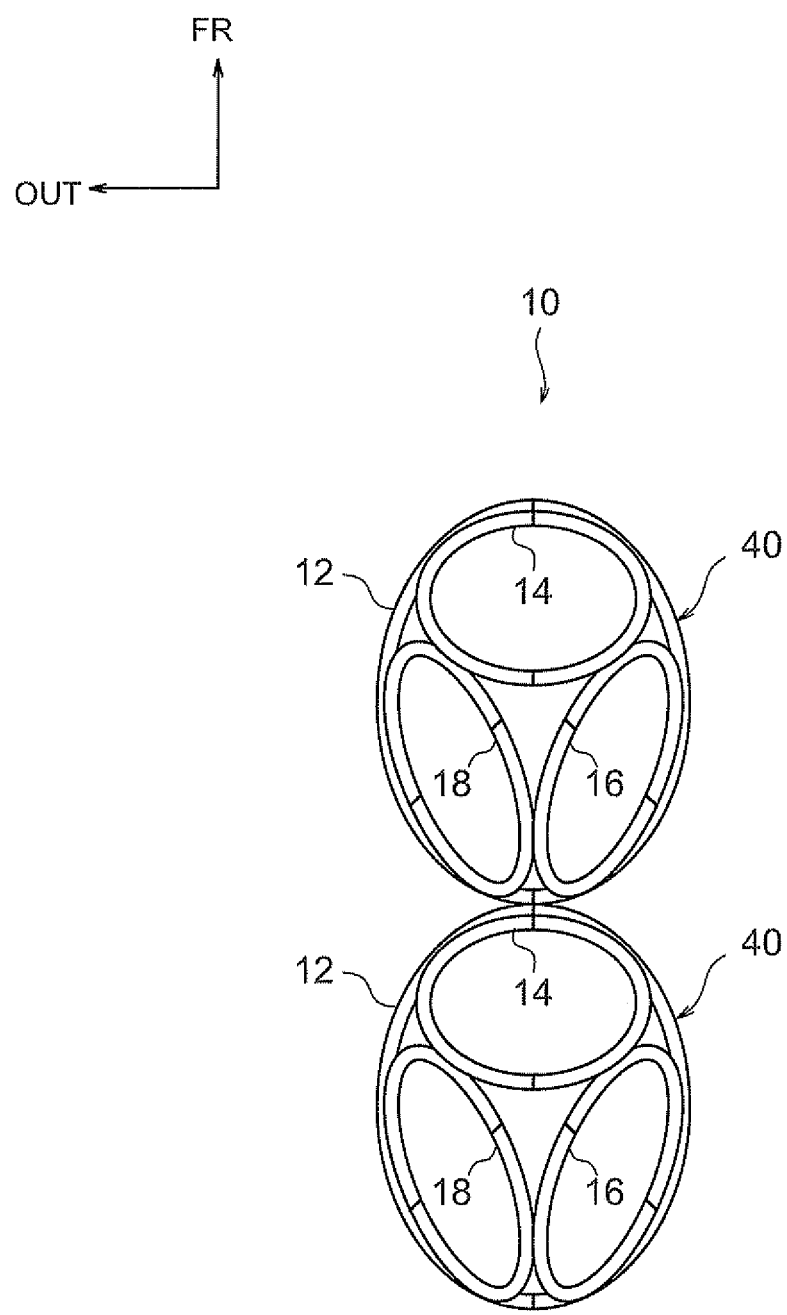
FIG. 8 is a plan view illustrating a modified example of a vehicle body structure according to an exemplary embodiment of the present invention.
Figure 9:
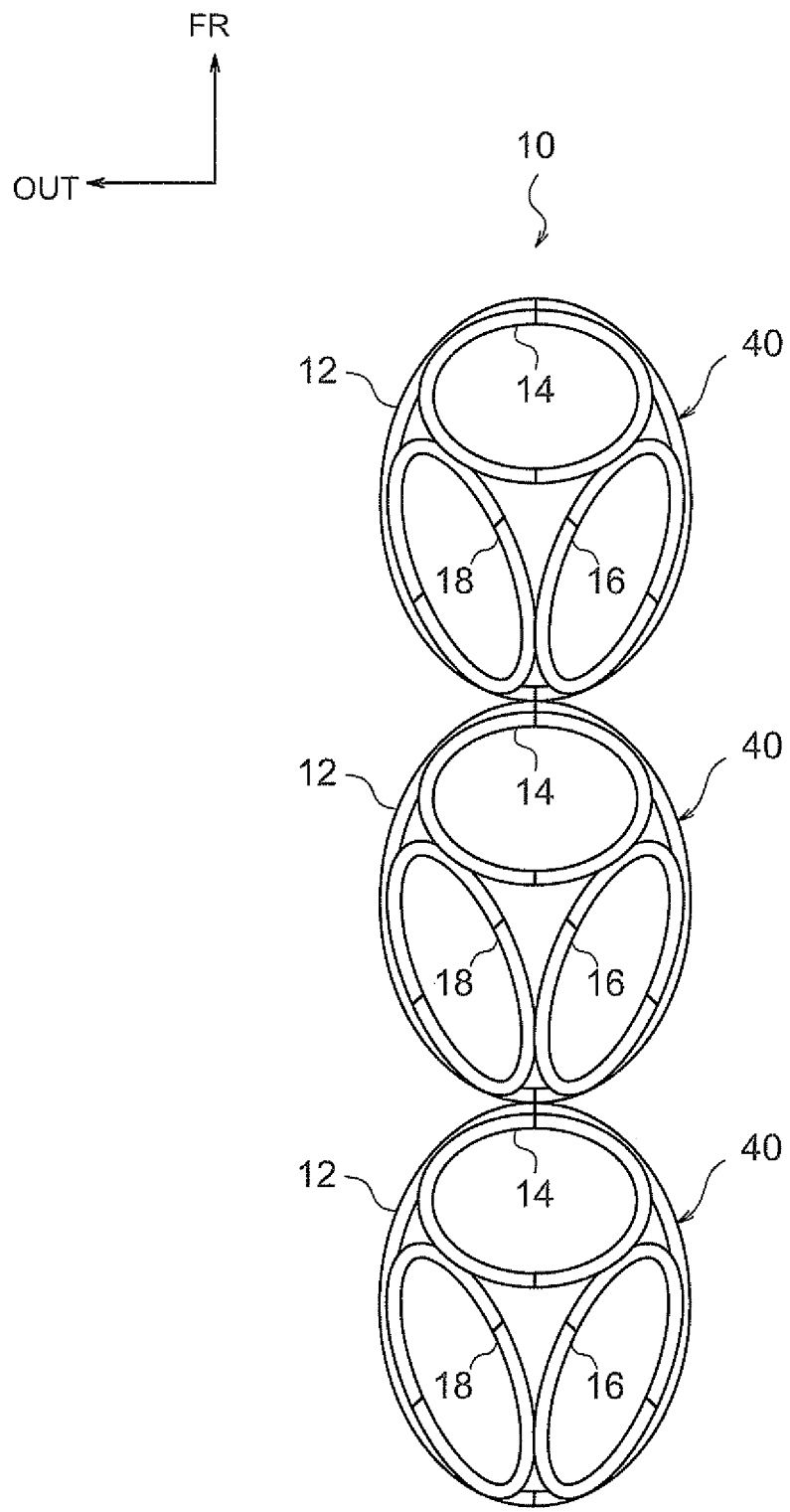
FIG. 9 is a plan view illustrating a modified example of a vehicle body structure according to an exemplary embodiment of the present invention.
Figure 10:
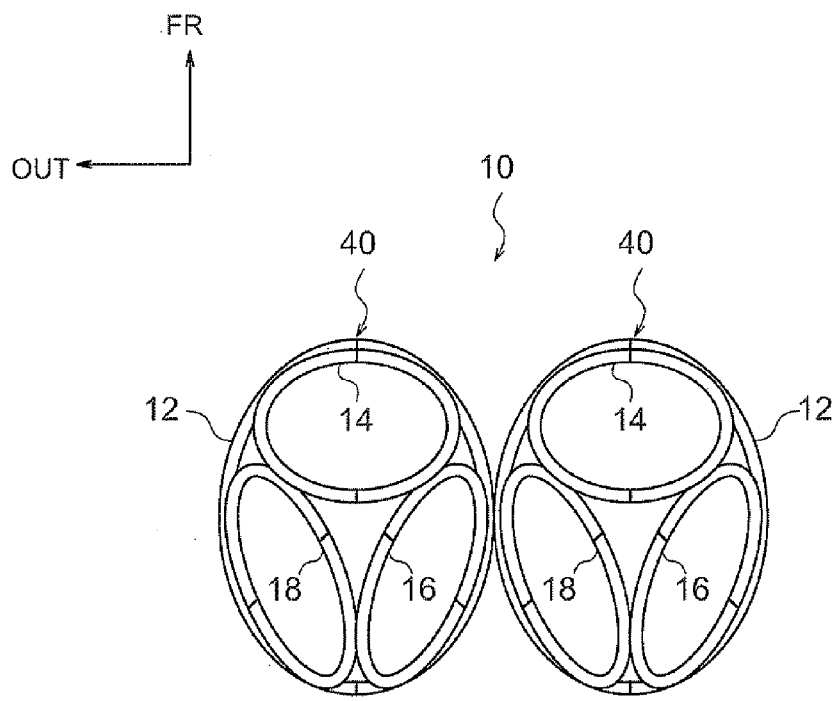
FIG. 10 is a plan view illustrating a modified example of a vehicle body structure according to an exemplary embodiment of the present invention.
Figure 11:
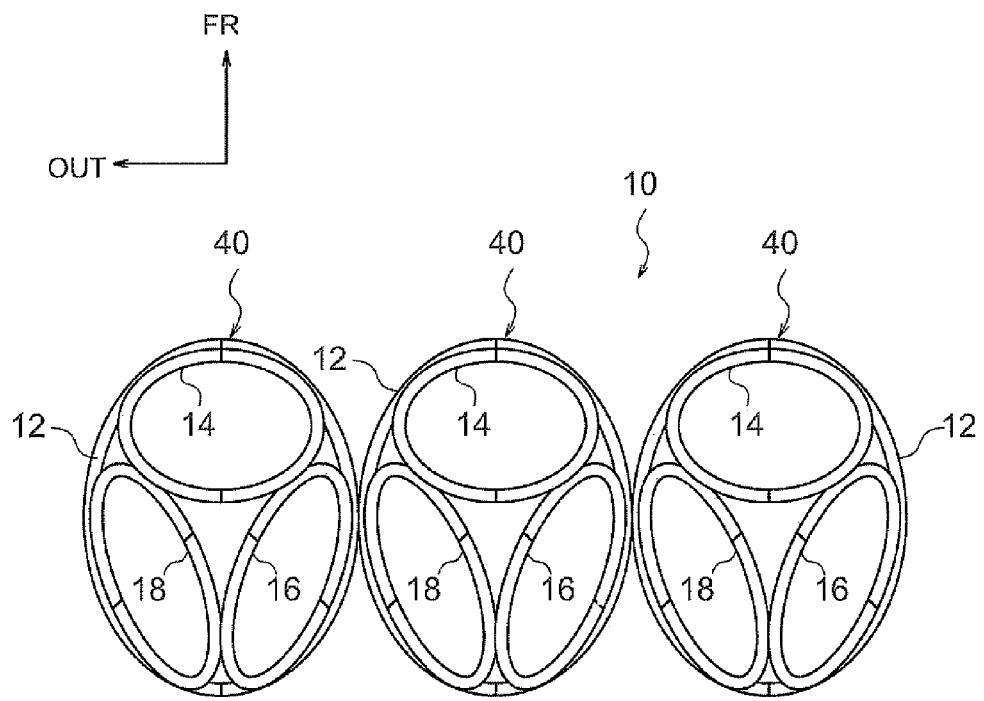
FIG. 11 is a plan view illustrating a modified example of a vehicle body structure according to an exemplary embodiment of the present invention.

For example, as shown in FIG. 8 and FIG. 9, plural vehicle body units 40, each configured by the base frame 12, the first upper frame 14 and the pair of second upper frames 16, 18, may be arrayed aligned along the vehicle front-rear direction. Or, as shown in FIG. 10 and FIG. 11, plural of the vehicle body units 40 may be arrayed aligned along the vehicle width direction.

Figure 12:
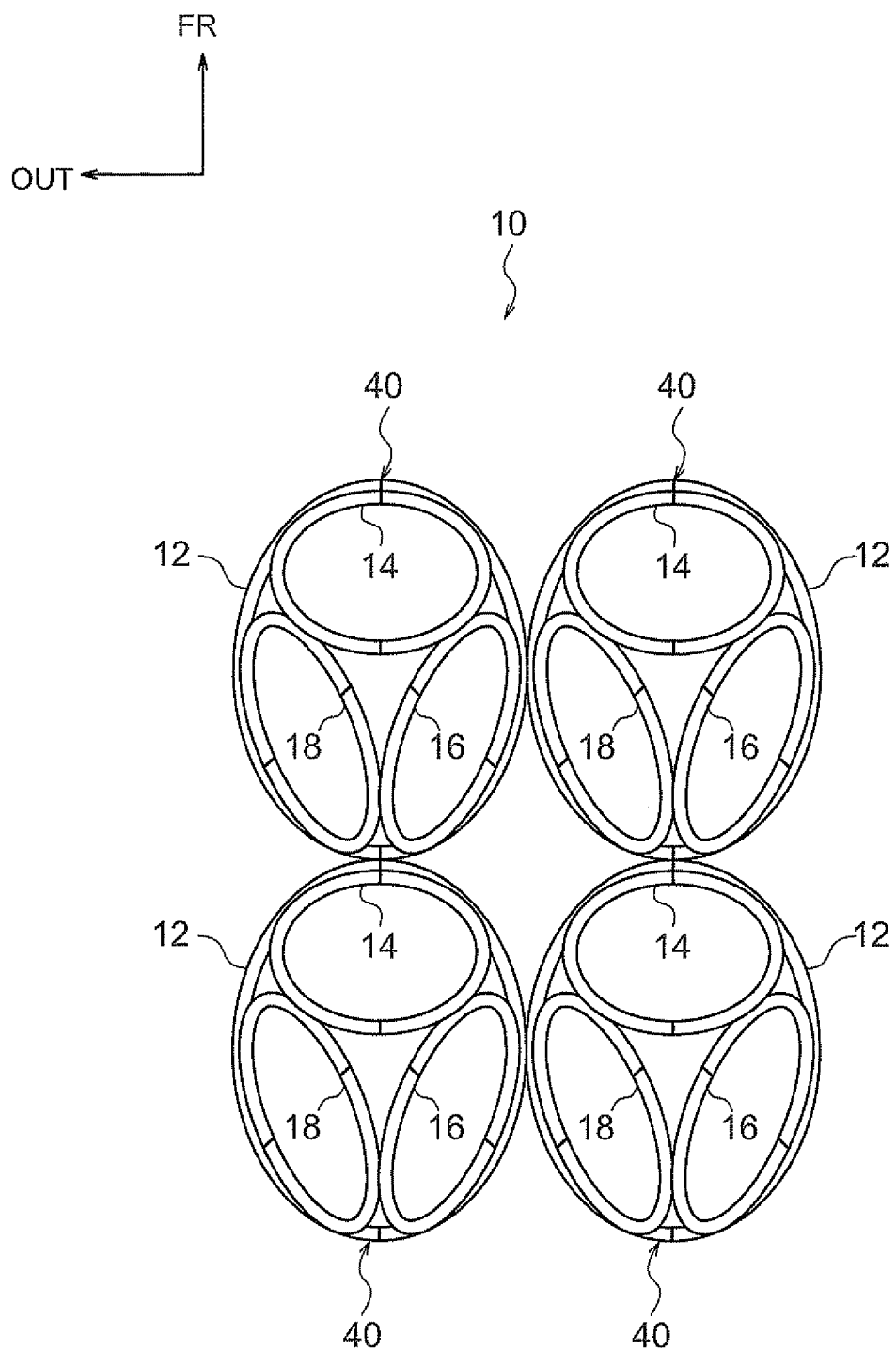
FIG. 12 is a plan view illustrating a modified example of a vehicle body structure according to an exemplary embodiment of the present invention.
Figure 13:
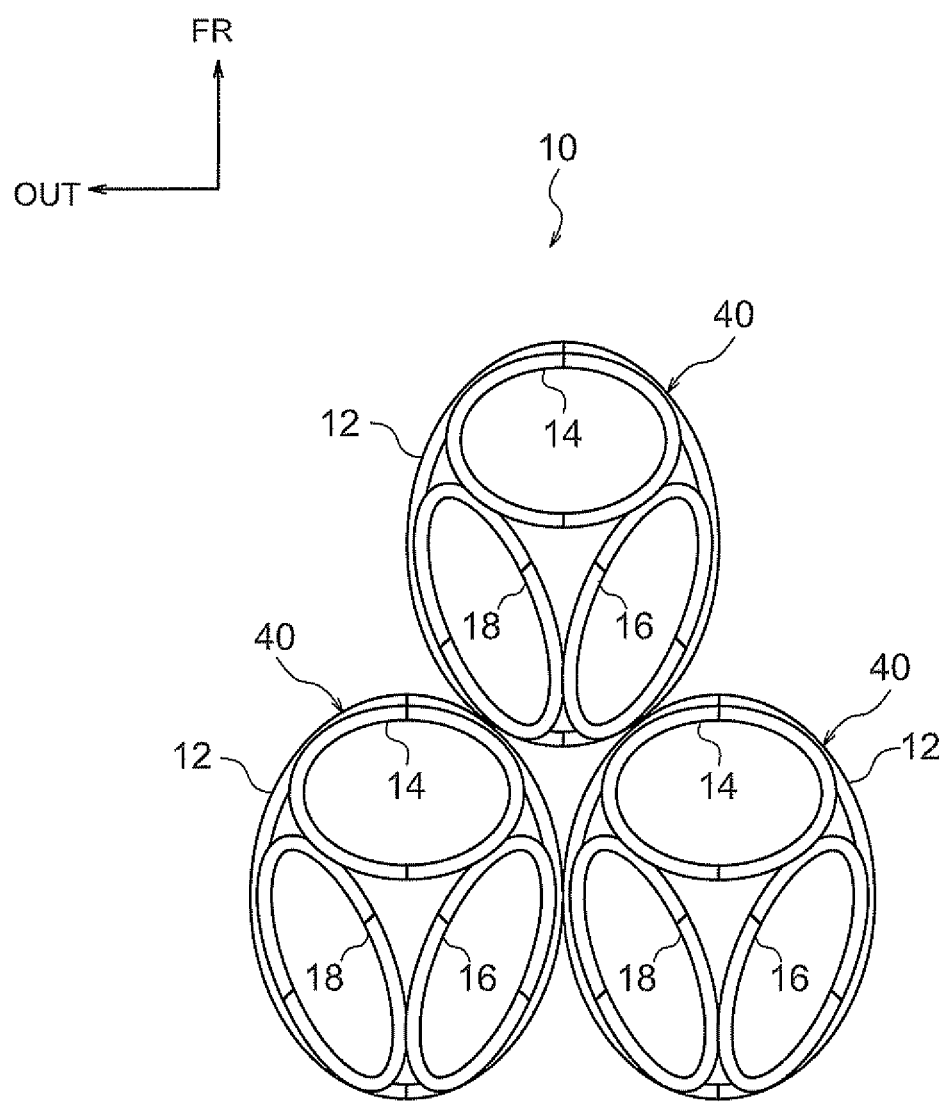
FIG. 13 is a plan view illustrating a modified example of a vehicle body structure according to an exemplary embodiment of the present invention.
Figure 14:
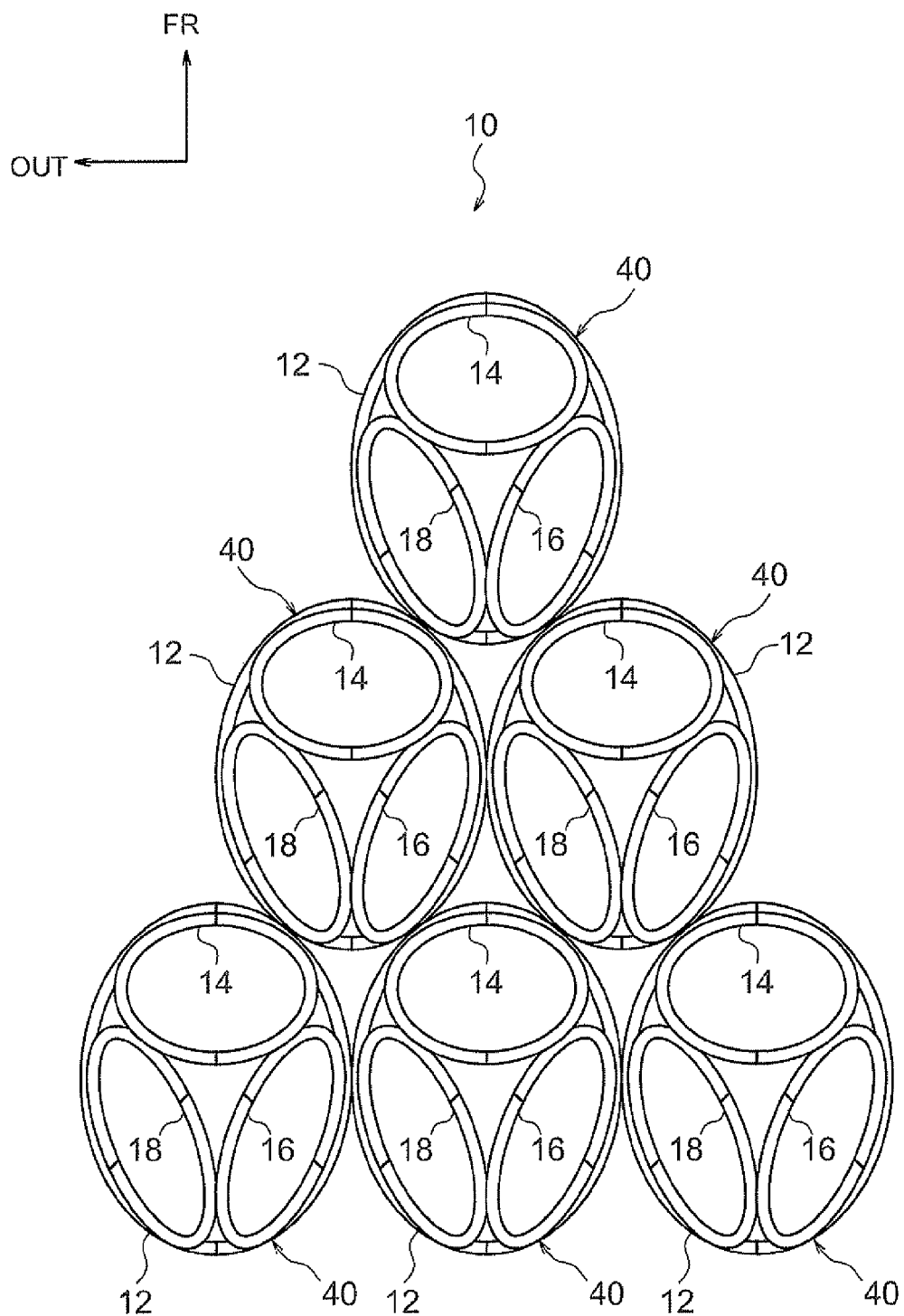
FIG. 14 is a plan view illustrating a modified example of a vehicle body structure according to an exemplary embodiment of the present invention.
Figure 15:
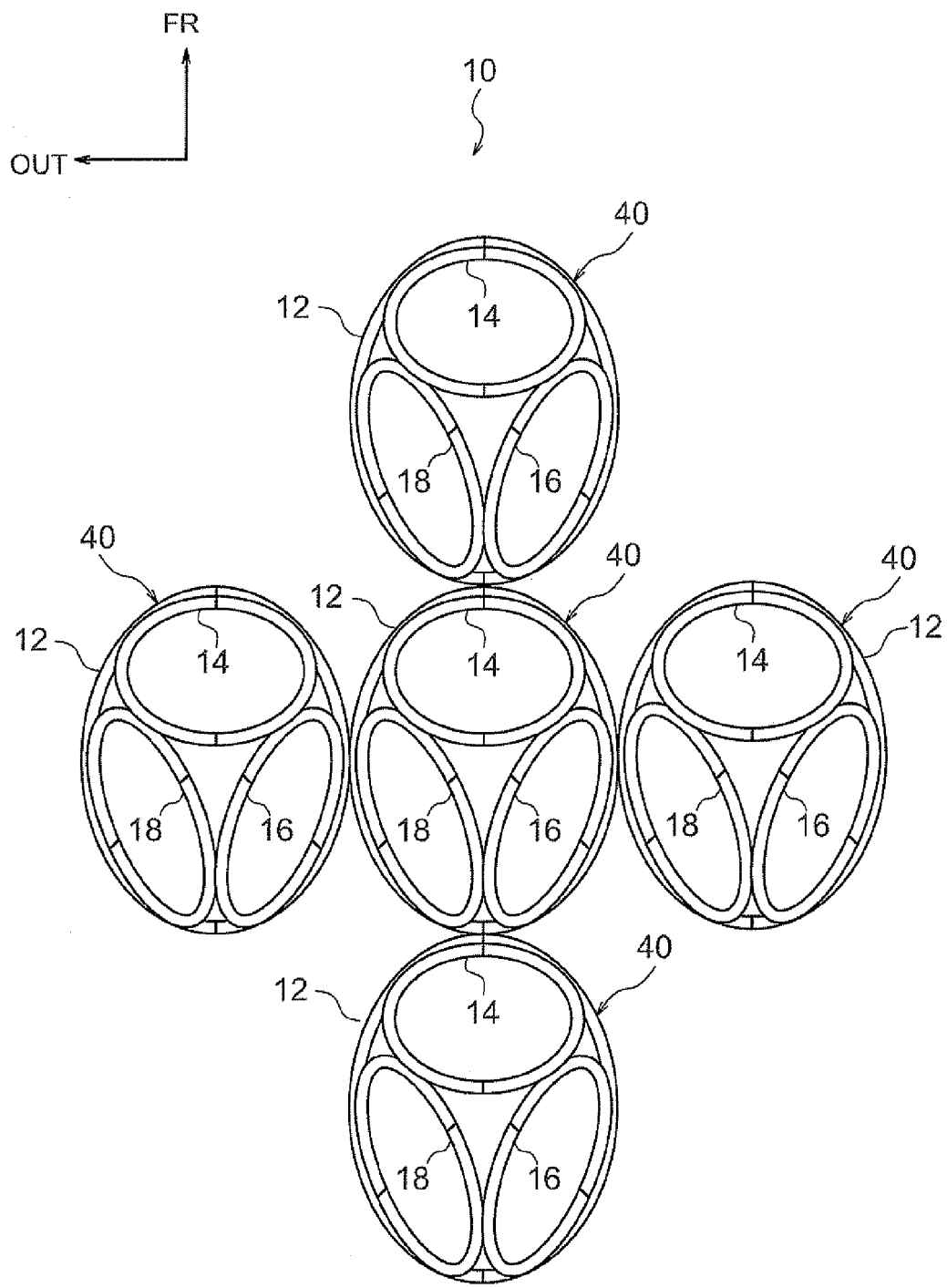
FIG. 15 is a plan view illustrating a modified example of a vehicle body structure according to an exemplary embodiment of the present invention.

Furthermore, as shown in FIG. 12, plural of the vehicle body units 40 may be arrayed in a matrix formation, or, as shown in FIG. 13 and FIG. 14, plural of the vehicle body units 40 may be arrayed in a pyramid shape. Configuration may also be made, as shown in FIG. 15, with plural of the vehicle body units 40 arrayed in a cross shape.

In the above modified examples, adjacent vehicle body units are connected to each other in the plural vehicle body units 40.

Figure 16:
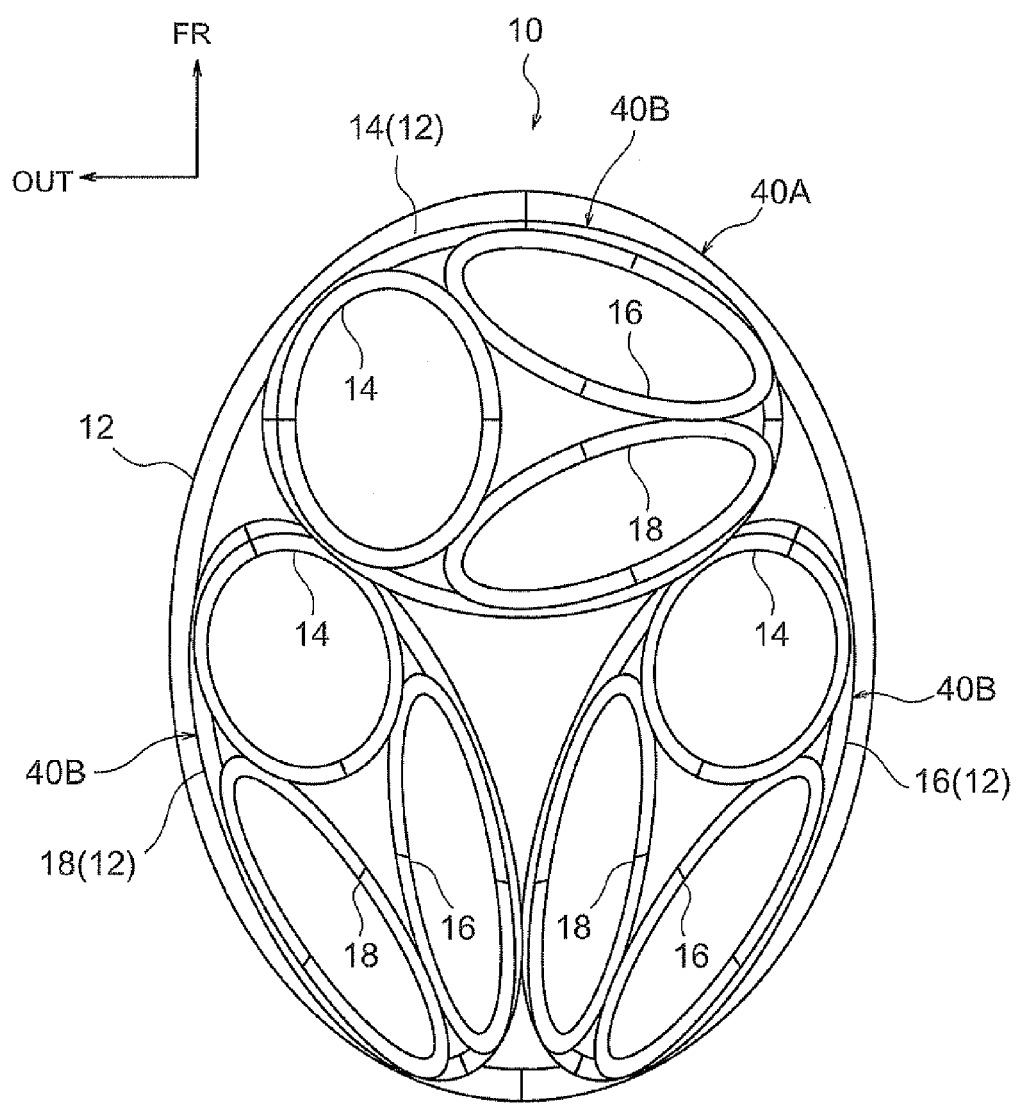
FIG. 16 is a plan view illustrating a modified example of a vehicle body structure according to an exemplary embodiment of the present invention.

Configuration may also be made, as shown in FIG. 16, with a vehicle body unit 40A provided with a base frame 12, a first upper frame 14 and a pair of second upper frames 16, 18, wherein each of the first upper frame 14 and the pair of second upper frames 16, 18 of the vehicle body unit 40A is in turn configured by a vehicle body unit 4013 provided with a first upper frame 14 and a pair of second upper frames 16, 18.

The first upper frame 14, the second upper frame 16 and the second upper frame 18 configuring the vehicle body unit 40A in this modified example are configured by the base frames 12 of the respective vehicle body units 40B.

While not particularly illustrated, the modified examples shown in FIG. 8 to FIG. 16 may also be provided with impact absorbing member(s) (see FIG. 7) on the vehicle outer side of the base frame 12 (the base frame(s) that are located on the outermost portion of the vehicle for cases of plural arrayed base frames).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A vehicle body structure comprising:
an elastic base frame formed in a ring shape; and
three elastic upper frames each formed in a ring shape, the three upper frames being disposed on the base frame so as to configure a tetrahedron with the base frame, the three upper frames being connected to the base frame, and the upper frames that are adjacent to each other in a peripheral direction of the base frame being connected to each other.

2. The vehicle body structure of claim 1, wherein:
the base frame is disposed substantially parallel to a vehicle horizontal direction; and
the three upper frames comprise
a first upper frame that are disposed so as to extend along a vehicle width direction at a front portion of the base frame in a vehicle front-rear direction, and
a pair of second upper frames that are disposed at a rear portion of the first upper frame in the vehicle front-rear direction and that is configured to be symmetrical about a plane at a central portion of the base frame in the vehicle width direction.

3. The vehicle body structure of claim 1, wherein the base frame and the three upper frames are each formed with fiber reinforced composites.

4. The vehicle body structure of claim 1, further comprising an impact absorbing member provided at a vehicle outer side of the base frame.

5. The vehicle body structure of claim 1, configured by a combination of a plurality of vehicle body units each configured by the base frame and the three upper frames.

6. The vehicle body structure of claim 5, further comprising an impact absorbing member provided at a vehicle outer side of one of the base frames that is positioned at a vehicle outermost portion of one of the vehicle body units of the combination of the plurality of vehicle body units.

* * * * *